(12) United States Patent
Stein et al.

(10) Patent No.: US 12,240,641 B2
(45) Date of Patent: Mar. 4, 2025

(54) SEALING METHOD

(71) Applicant: WATTTRON GmbH, Freital (DE)

(72) Inventors: Marcus Stein, Freital (DE); Sascha Bach, Freital (DE)

(73) Assignee: WATTTRON GmbH, Freital (DE)

(*) Notice: Subject to any disclaimer, the term of this patent is extended or adjusted under 35 U.S.C. 154(b) by 132 days.

(21) Appl. No.: 18/025,405

(22) PCT Filed: Sep. 9, 2021

(86) PCT No.: PCT/EP2021/074849
§ 371 (c)(1),
(2) Date: Mar. 9, 2023

(87) PCT Pub. No.: WO2022/053574
PCT Pub. Date: Mar. 17, 2022

(65) Prior Publication Data
US 2023/0331418 A1 Oct. 19, 2023

(30) Foreign Application Priority Data
Sep. 9, 2020 (DE) .................. 10 2020 123 565.8

(51) Int. Cl.
B65B 51/14 (2006.01)
B29C 65/30 (2006.01)
B29C 65/82 (2006.01)
B29L 31/00 (2006.01)
B65B 51/10 (2006.01)

(52) U.S. Cl.
CPC .............. B65B 51/14 (2013.01); B29C 65/30 (2013.01); B29C 65/8276 (2013.01); B29L 2031/712 (2013.01); B65B 2051/105 (2013.01)

(58) Field of Classification Search
CPC ... B65B 51/14; B65B 2051/105; B29C 65/30; B29C 65/8276; B29C 65/18; B29C 66/91231; B29C 66/91423; B29C 66/91651; B29C 65/02; B29L 2031/712
See application file for complete search history.

(56) References Cited

U.S. PATENT DOCUMENTS

2021/0276755 A1* 9/2021 Bach .................. B29C 66/232

FOREIGN PATENT DOCUMENTS

WO WO-2018055034 A1 * 3/2018 ............. B29C 65/18

* cited by examiner

Primary Examiner — Vishal I Patel
(74) Attorney, Agent, or Firm — Soquel Group LLC

(57) ABSTRACT

Embodiments of the invention relate to a sealing element for thermally connecting thermoplastic materials along a bent or curved contour, including a plurality of flat support substrates with a front face and a rear face, the substrates having at least one heating element on the front face, and including a contoured element which has a front face in the shape of the contour to be sealed, wherein the rear face of the support substrates is secured to the front face of the contoured element and/or the front face of the support substrates is secured to the rear face of the contoured element.

10 Claims, 3 Drawing Sheets

SEALING METHOD

CROSS-REFERENCE TO RELATED APPLICATIONS

This application claims benefit under 35 USC § 371 of PCT Application No. PCT/EP2021/074849 entitled SEALING METHOD, filed on Sep. 9, 2021 by inventors Marcus Stein and Sascha Bach. PCT Application No. PCT/EP2021/074849 claims priority of German Patent Application No. 10 2020 123 565.8, filed on Sep. 9, 2020.

FIELD OF THE INVENTION

The invention relates to improvements of sealing methods.

BACKGROUND OF THE INVENTION

The term "sealing" is understood herein to mean the cohesive bonding, in particular of plastics, primarily for the production of packagings composed of thermoplastic materials such as plastic films or film composites, such as, for example, plastic films coated with metallic and nonmetallic materials, thermoplastic-coated metal films such as aluminum film and the like, for example during the production of tubular bags, the closing of containers, for example by applying a seal made of plastic film with or without an aluminum coating, plastic-coated aluminum film or other thermally weldable materials to containers composed of plastic with or without a coating or composed of aluminum with a plastic coating, or the sealing/welding of films or film composites of the type mentioned above.

Sealing is carried out usually using heated sealing tools (also referred to as sealing members). The latter generally consist of a heating cartridge (wound resistive conductor) and a main body, in which the heating cartridge and a temperature sensor required for the temperature regulation are integrated.

WO 2018/055034 A1 describes a sealing member in which heat-generating elements of a heating element are contacted from the rear side thereof. Further aspects concern a sealing member in which the location of heat generation and the location of heat dissipation (i.e. the site of action) are arranged as close to each other as possible, a heating element having an integrated temperature sensor, a sealing member with the possibility of the heating element and/or the material which is to be welded being cooled or sucked up as necessary.

DETAILED DESCRIPTION OF EMBODIMENTS

Figure 1:
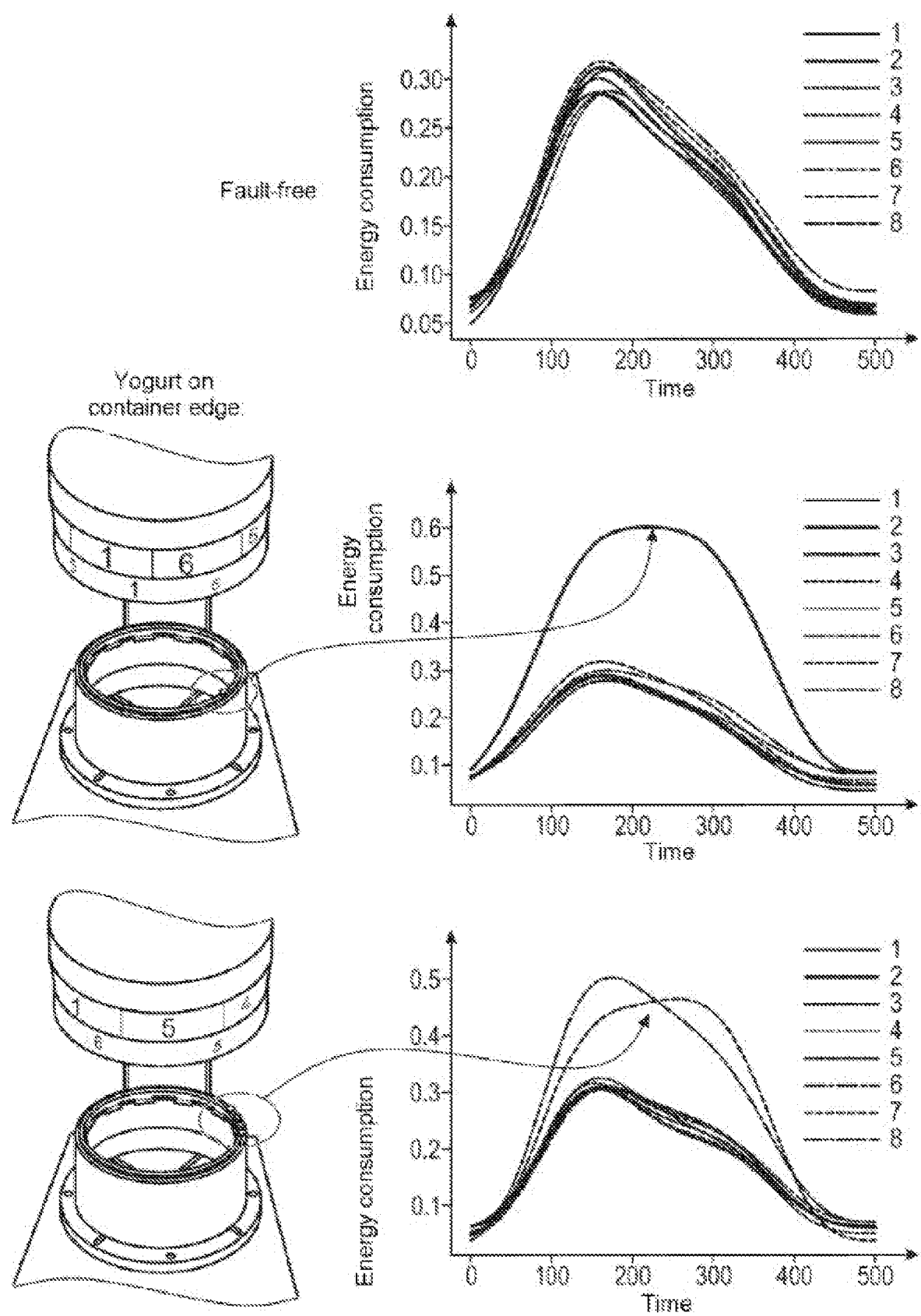
FIG. 1 shows time curves of the energy consumption of all heating elements involved in the sealing of a yogurt cup for a fault-free sealing (top) and for two faulty sealings due to a yogurt droplet on the cup rim (middle and bottom).

For sealing members of the type described which are provided with a multiplicity of heating elements, which are controllable individually or in groups, specifically irrespective of whether the heating elements are arranged for sealing a planar, bent or curved contour, and irrespective of whether a carrier element has one or more heating elements, a sealing method is proposed which is energy-saving, enables the best results with maximum reliability and additionally enables inline quality control, i.e. monitoring of the sealing process while it is taking place, with integrated fault detection.

An essential feature of the heating elements from watttron GmbH is the division of the heating area into very small individual regulating circuits (heating pixels, or heating circuit segments in the case of a circular heater), the temperature of which can be regulated individually. Therefore, the sealing seam in the case of a bag seal or the heating area in the case of the thermoforming preheating plate is subdivided into a minimum regulatable area.

This subdivision has the advantage of being able to react to local different power demands (e.g. as a result of a layer jump of the packaging or edge effects) in a targeted manner. A further advantage is the measurability of precisely these locally different demands, by measurement of the output power of each individual area, or of the thus determinable energy output (energy absorption in the case of cooling) over a certain time period e.g. of the machine cycle. The concept involves monitoring these local information items from the heating process and using them for monitoring the process or inline quality control by way of an algorithm.

For this purpose, in the case of a sealing member of the type described which has a plurality of heating elements, which are individually controllable, the sealing member is heated and pressed onto the material to be sealed while the sealing takes place, and from each heating element a characteristic variable, for example the energy consumption, is measured and evaluated.

In this context, the "evaluating" can comprise for example the acquisition of the total energy of each heating element involved and the subsequent comparison of the energy consumption of each heating element with the energy consumption of all other heating elements. This is helpful in particular if there is a new application in which the behavior of the material and of the heating elements for attaining a proper, reliable seal is not yet sufficiently known. In this case, the comparison of the heating elements with one another can yield an indication of a quality problem.

If a specific application is already managed well, then the acquired data from characteristic variables or characteristic values can particularly advantageously be used to generate a database of process parameters and subsequently to use it for process control. Self-learning algorithms ("unsupervised learning") are preferably employed here, which can make the method manageable particularly rapidly, efficiently and accurately even in the case of previously unknown applications.

The chosen characteristic variable can be acquired for example over the entire time duration of a sealing process, and the evaluation can be restricted to the maximum value of the characteristic variable, or the acquired characteristic variable is integrated over time and an individual characteristic value is thereby ascertained, for example the total energy consumption of each heating element per sealing process.

Examples: If the intention for example is to seal a lid composed of aluminum film onto a yogurt container composed of plastic and the sealing member has a multiplicity of heating elements, which are individually controllable, then the energy consumption of all heating elements as considered over the time of the sealing process will be similar: in the energy-time trace a curve appears which initially rises relatively sharply from close to zero, reaches a maximum and then falls again down to close to zero. The qualitative progression of the curves is relatively similar for all the heating circuits. If the sealing proceeded successfully and as desired, then the curves match relatively well from a quantitative standpoint as well.

Figure 2:
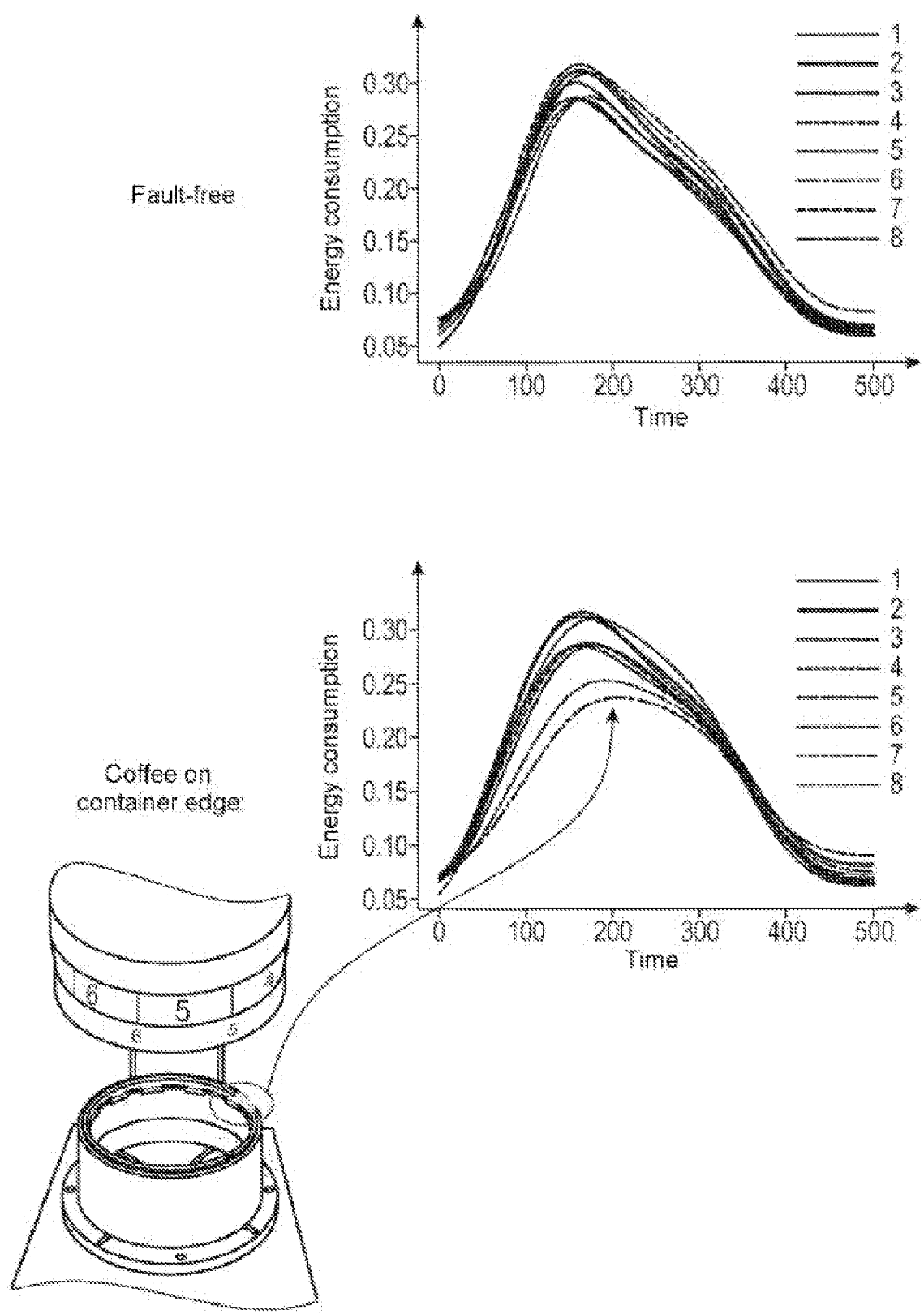
FIG. 2 shows time curves of the energy consumption of all heating elements involved in the sealing of a coffee capsule for a fault-free sealing (top) and for a faulty sealing due to coffee powder on the edge of the capsule (bottom).
Figure 3:
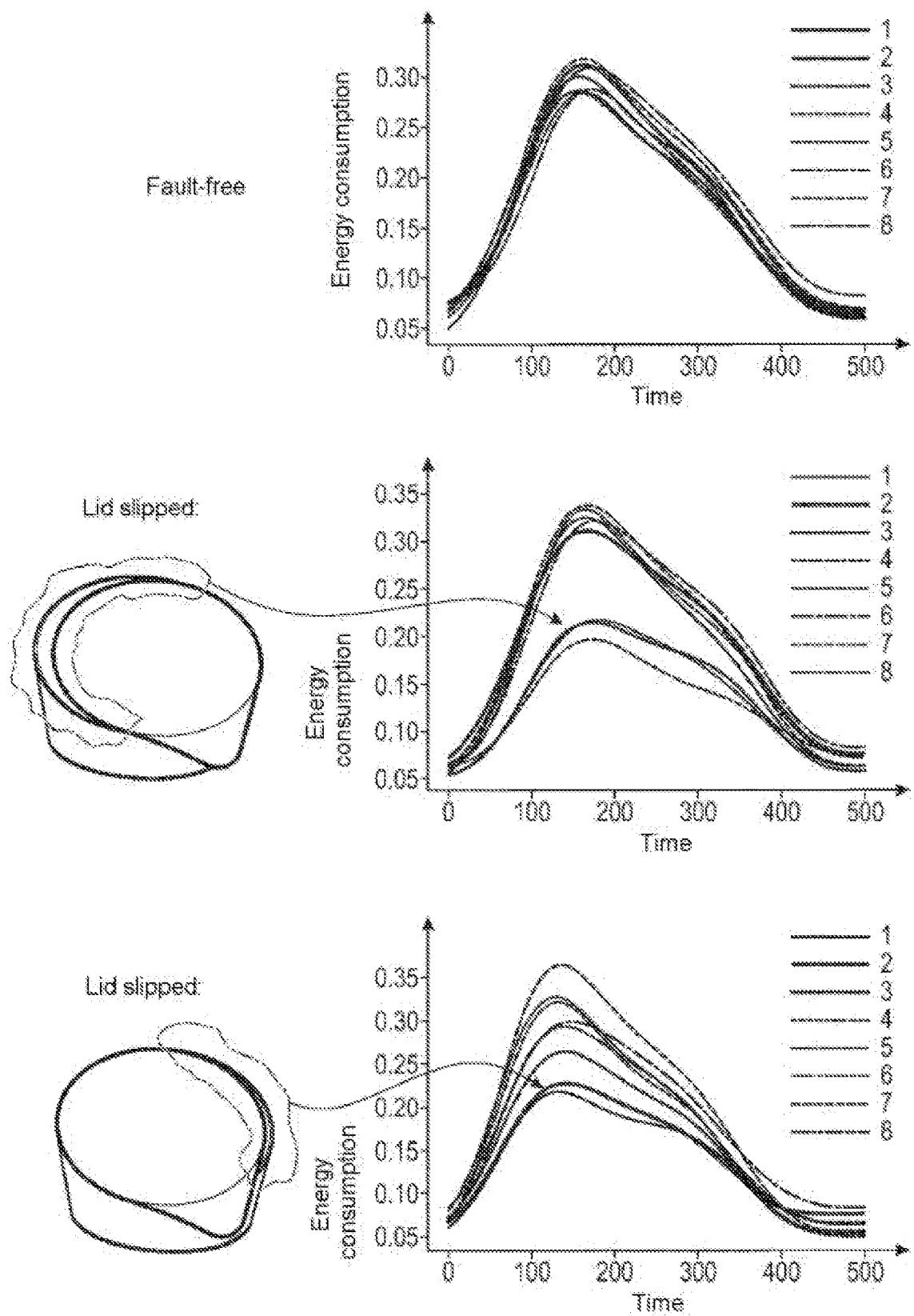
FIG. 3 shows time curves of the energy consumption of all heating elements involved in the sealing of a container for a fault-free sealing (top) and for two faulty sealings due to a lid that has slipped in relation to the container (middle and bottom).

However, if a problem occurred, then the energy-time traces reveal a difference at least from a quantitative standpoint: for example, it may happen that as the container is being filled with yogurt, drops of yogurt end up on the edge of the container (FIG. 1). In the case of coffee capsules, coffee powder may analogously end up on the edge of the container (FIG. 2). In addition, a fault may consist in the lid slipping, i.e. being situated incorrectly, relative to the container (FIG. 3). To put it more generally, two workpieces to be welded together may be positioned inaccurately relative to one another. In all these cases, the proposed method affords the possibility of recognizing the presence of a fault and making a targeted intervention in order to avoid or separate out low-quality products and in this way to ensure the quality of production.

In the cases mentioned, at least one heating element, sometimes also two or more adjacent heating elements, either requires distinctly more energy for sealing, since the drop of yogurt situated between container edge and lid film absorbs additional energy until all moisture has escaped therefrom, or the affected heating element(s) consume(s) distinctly less energy, since the coffee powder obstructs the heat transfer or the heating elements act only on the container edge and not on the lid film. In each of these cases, a potential quality problem can be recognized from local deviations of the measured characteristic variables or characteristic values, and so a suitable action can be implemented.

Alternatively or additionally, from each heating element a different characteristic variable, for example the temperature, over time can also be measured and evaluated. In a manner similar to that as described above, the comparison of the measured temperature-time progressions makes it possible to recognize whether and where there is possibly a quality problem.

A continuously repeating thermal process is characterized by a constant power demand in the static case. Accordingly, in the course of relatively long observation, it is possible to determine an expected value with its "normal" fluctuation range with regard to power progression or amount of energy per cycle. If this expected value is known for each heating region, it is possible to determine deviations beyond the tolerance range which allow a change in the process to be deduced.

Besides the comparison with respect to the temporal progression, the local comparison is also possible in the case of similar thermal conditions of adjacent heating areas. By way of example, all heating circuits along a circular sealing contour exhibit the similar power demand in the case of a clean sealing edge. If contamination occurs in a partial region of the sealing edge, the affected heating circuit is detectable by way of the direct comparison with the other progressions or energy values of one seal.

Furthermore, an analysis over various sealing processes is also possible. By way of example, heating circuits with different target temperatures (a so-called temperature profile) indicate different power demands when compared among one another. Across a plurality of sealing processes, however, the power behavior of the individual heating circuit remains similar and thus comparable. A contamination in a partial region would then mean a deviation of the power demand in comparison with the previous seals.

A further stage of development of the use of power demands or energy consumptions is the recognition of fault states. In this case, it is possible not only to differentiate between good and bad, but also to determine the cause of the disturbance or change. For this purpose, the algorithm is trained by being informed of the reason when the fault case occurs for the first time ("supervised learning"). With increasing availability of data, the algorithm can compare the measurement data with its fault masks stored in a database or with the configured neural network and thereby deduce repetitions of known cases and can state the reason for the disturbance together with a probability.

Applications detection of dirt, contaminations and undesired film faults in the region of the sealing seam in packaging processes, detection of process alterations in the packaging process, e.g. the slipping or absence of film material or of desired folds and layer jumps (longitudinal seam), detection of material changes by evaluation of the power progression and thus deduction of film thickness and heat capacity, detection of tool alterations, e.g. of accumulation building up over several cycles on the surface of the sealing tool, use of the energy evaluation as central temporal machine control instead of a defined process-independent machine cycle.

The invention claimed is:

1. A sealing method for thermally bonding thermoplastic materials along a planar, bent or curved sealing contour of a product, comprising:
   heating, in a packaging machine a sealing member;
   pressing, in the packaging machine, the sealing member onto a region to be sealed, wherein the sealing member has a plurality of heating elements, which are individually controllable; and
   process control, comprising:
     measuring a characteristic variable from each heating element; and
     evaluating the characteristic variable from each heating element, comprising deciding whether the product is fault-free or faulty.

2. The sealing method as claimed in claim 1, wherein acquired from characteristic variables and the decision whether the product is fault-free or faulty are stored.

3. The sealing method as claimed in claim 1, wherein said process control further comprises:
   generating a database of process parameters using data acquired from characteristic variables; and
   using the database for process control.

4. The sealing method as claimed in claim 1, wherein said process control recognizes that the product is faulty and removes the faulty product from the process.

5. The sealing method as claimed in claim 1, wherein said process control constantly determines anew the length of a work cycle of the packaging machine from data acquired from characteristic variables.

6. The sealing method as claimed in claim 1, wherein the region to be sealed is a sealing contour of a product.

7. The sealing method as claimed in claim 1, wherein the characteristic values comprise energy consumption.

8. The sealing method as claimed in claim 7, wherein said evaluating comprises acquiring energy consumption of each heating element; and comparing the energy consumption of each heating element with the energy consumption of other heating elements.

9. The sealing method as claimed in claim 1, wherein the characteristic values comprise temperature over time.

10. The sealing method as claimed in claim 9, wherein said evaluating comprises acquiring a maximum temperature of each heating element; and comparing the maximum temperature of each heating element with the maximum temperature of other heating elements.

\* \* \* \* \*